United States Patent
Andrianakou et al.

(10) Patent No.: US 10,248,698 B2
(45) Date of Patent: Apr. 2, 2019

(54) NATIVE APPLICATION SEARCH RESULT ADJUSTMENT BASED ON USER SPECIFIC AFFINITY

(71) Applicant: Google LLC, Mountain View, CA (US)

(72) Inventors: Sofia Andrianakou, Sunnyvale, CA (US); Yuanying Xie, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 238 days.

(21) Appl. No.: 15/099,209

(22) Filed: Apr. 14, 2016

(65) Prior Publication Data

US 2016/0306801 A1 Oct. 20, 2016

Related U.S. Application Data

(63) Continuation of application No. PCT/GR2015/000022, filed on Apr. 16, 2015.

(51) Int. Cl.
G06F 17/30 (2006.01)

(52) U.S. Cl.
CPC .... *G06F 17/3053* (2013.01); *G06F 17/30477* (2013.01); *G06F 17/30554* (2013.01); *G06F 17/30598* (2013.01); *G06F 17/30867* (2013.01)

(58) Field of Classification Search
CPC .......... G06F 17/30554; G06F 17/3053; G06F 17/30477
USPC ...................................................... 707/707
See application file for complete search history.

(56) References Cited

U.S. PATENT DOCUMENTS

| | | | |
|---|---|---|---|
| 7,716,223 B2 | 5/2010 | Haveliwala et al. | |
| 8,583,632 B2 | 11/2013 | Libes et al. | |
| 8,626,774 B2 | 1/2014 | Avadhanam et al. | |
| 8,996,250 B2 * | 3/2015 | Hales | B62D 5/0463 701/1 |
| 9,117,197 B1 * | 8/2015 | Sharma | G06Q 10/10 |
| 9,767,159 B2 * | 9/2017 | Chen | G06F 17/3053 |

(Continued)

FOREIGN PATENT DOCUMENTS

WO 2013/184383 12/2013

OTHER PUBLICATIONS

International Search Report and Written Opinion issued in International Application No. PCT/GR2015/000022, dated Dec. 1, 2016, 10 pages.

(Continued)

*Primary Examiner* — Marcin R Filipczyk
(74) *Attorney, Agent, or Firm* — Fish & Richardson P.C.

(57) ABSTRACT

Methods, systems, and apparatus, including computer programs encoded on a computer storage medium, for affinity based ranking of native applications. In one aspect, a method includes accessing application affinity data for a user device from which a query was received, receiving a set of search results that each identify a respective resource determined to be responsive to the query, wherein one or more of the search results are a native application search results that each include a deep link to a respective one of the native applications installed on the user device from when the query was received, for each of the native application search results, determining the affinity score of the native application, adjusting the search results based on the affinity scores to generate an adjusted set of search results, and providing, to the user device, the adjusted search results.

19 Claims, 4 Drawing Sheets

(56) References Cited

U.S. PATENT DOCUMENTS

| | | |
|---|---|---|
| 2012/0124061 A1 | 5/2012 | Macbeth et al. |
| 2012/0124072 A1 | 5/2012 | Vaidyanathan et al. |
| 2012/0158685 A1 | 6/2012 | White et al. |
| 2012/0316955 A1 | 12/2012 | Panguluri et al. |
| 2013/0339345 A1 | 12/2013 | Soto Matamala et al. |
| 2014/0201179 A1 | 7/2014 | Chang et al. |
| 2014/0280234 A1* | 9/2014 | Chang ............... G06F 17/30864 707/749 |
| 2015/0363401 A1* | 12/2015 | Chen ................... G06F 17/3053 707/723 |

OTHER PUBLICATIONS

International Preliminary Report on Patentability issued in International Application No. PCT/GR2015/000022, dated Oct. 17, 2017, 8 pages.
"A Complete Guide to Mobile App Indexing and Ranking," Fort Meyers Web Design, Dec. 24, 2016 [retrieved on Jul. 23, 2014]. Retrieved from the Internet: URL<http://www.anameless.com/search_engine_optimization/a-complete-guide-to-mobile-app-indexing-and-ranking/>, 4 pages.

* cited by examiner

NATIVE APPLICATION SEARCH RESULT ADJUSTMENT BASED ON USER SPECIFIC AFFINITY

CROSS-REFERENCE TO RELATED APPLICATIONS

This application is a continuation application of, and claims priority to, PCT Patent Application No. PCT/GR2015/000022, titled "Native Application Search Result Adjustment Based On User Specific Affinity," filed on Apr. 16, 2015. The disclosure of the foregoing application is incorporated herein by reference in its entirety for all purposes.

BACKGROUND

This specification describes technologies relating to ranking resources in response to user device queries.

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. With the advent of tablet computers and smart phones, native applications that facilitate the performance of the same functions facilitated by the use of web page resources, and additional, different functions, are now being provided in large numbers. Additionally, native applications that do not have websites with synchronous content, such as games, are also very popular on tablet computers and smart phones.

Search engines now also facilitate searching of the native applications along with web pages. Typically, the ranking of native application search results is based on the relevance of the content of the native application, or content for a particular deep link in a native application, to a search query. Additional information, such as whether a particular application is installed on a user device, and/or application information specific to a user device provided with a query, may also be used to process a search query for a search operation.

SUMMARY

In general, one innovative aspect of the subject matter described in this specification can be embodied in methods that include the actions of receiving a search query submitted from a user device for a search operation; accessing application affinity data for the user device from which the query was received, the application affinity data describing, for a plurality of native applications installed on the device, an affinity score for the native application that measures the user's affinity for the native application relative to other native applications, and wherein the application affinity data is received responsive to a reporting process that is separate from the search operation; receiving a set of search results that each identify a respective resource determined to be responsive to the query, and wherein each of the identified resources has a corresponding search score by which the resource is ranked in responsiveness to the search relative to other resources, and wherein one or more of the search results are a native application search results that each include a deep link to a respective one of the native applications installed on the user device from when the query was received; for each of the native application search results, determining the affinity score of the native application; adjusting the search results based on the affinity scores to generate an adjusted set of search results; and providing, to the user device, the adjusted search results. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter allows the scoring and ranking of resources based on an application affinity score derived from application affinity data responsive to a reporting process that is separate from the search operation. A search system, by receiving and processing the reporting data separate from the query, can index and model a user's affinity for particular applications and readily and efficiently process queries at query time to take into account the user's affinity for particular native applications. The use of such affinity scores results in the identification of native application search results that are more likely to satisfy the user's informational need than results that do not take into account the user's affinity. By providing more personalized, and thus, more relevant search results, users will show preference to the engine.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system receives, from user devices, native application reporting data that describes, for each user device, usage of native applications on the user device. The reporting data includes for each native application, for example, the frequency of use of the native application, a description of actions taken by use of the native, a description of an average duration of use of the native application, a description of a total time duration of use of the native application, and whether the native application is a preferred native application for a particular operation from among a set of native applications installed on the user device that can perform the particular operation.

The reporting data are then used to determine application affinity data describing, for each user device and for the native applications installed on the device, an affinity score for the native application that measures the user's affinity for the native application relative to other native applications. Other information, such as whether a native application was installed on the user device and then removed, can also be stored.

At query time, a search query submitted by a user device is received. The search system accesses the affinity data to determine the affinity scores for the native applications on the user device. The search system generates a set of search results that each identify respective content determined to be responsive to the query. Each of the search results has a corresponding search score by which the content is ranked in responsiveness to the search relative to the content identified by other search results.

Some of the search results are native application search results that each include a deep link to a respective one of the native applications installed on the user device from which the query was received. For each of these native application search results, the affinity score is used to adjust the search score of the search result and form an adjusted set of search results by adjusting the order of the search results. The adjusted set of search results is then provided to the user device.

These features and other features are described in more detail below.

Figure 1:
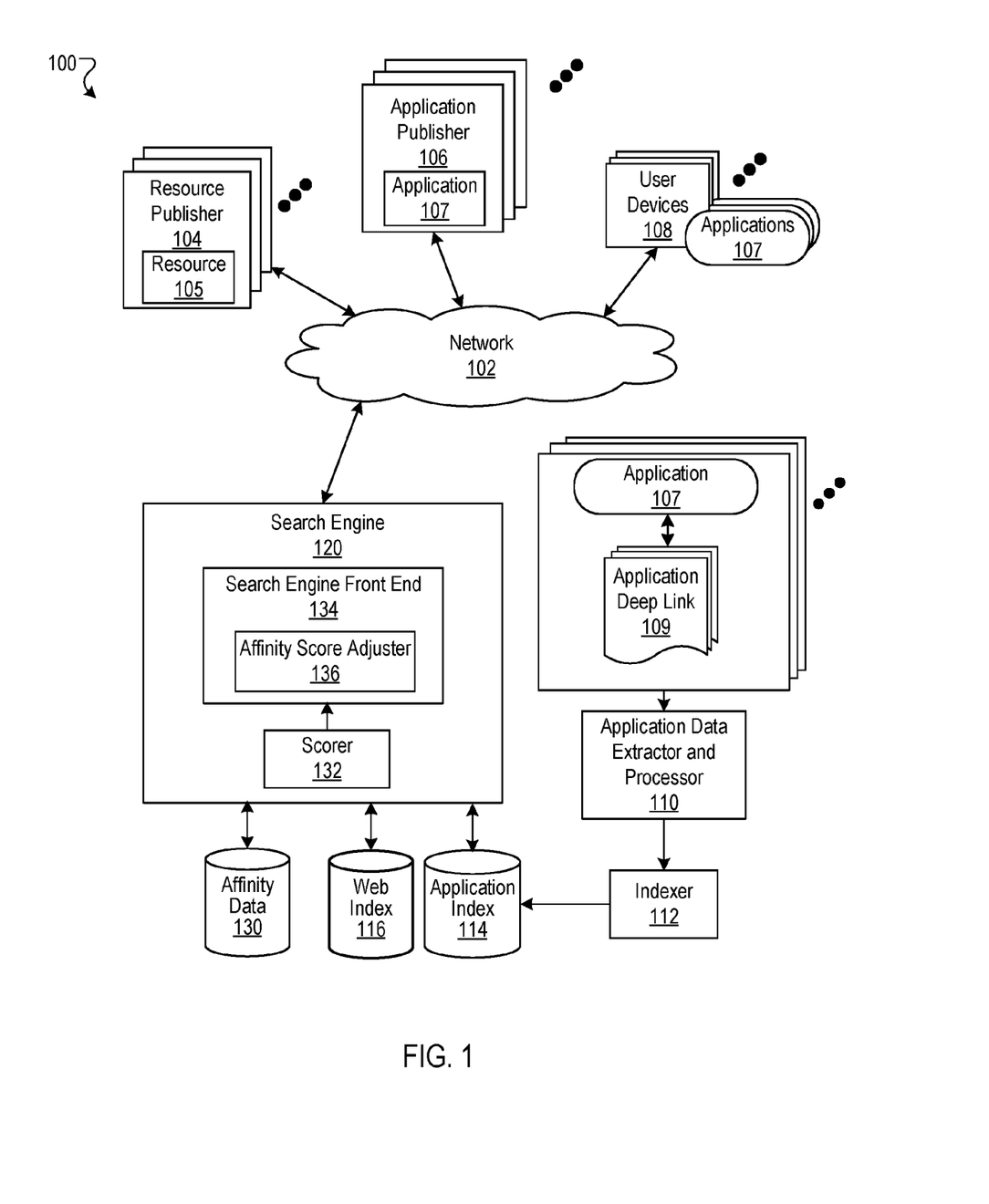
FIG. 1 is a block diagram of an example environment in which adjustments based on affinity scores are made to native application search results.

FIG. 1 is a block diagram of an example environment 100 in which adjustments based on affinity scores are made to native application search results. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher web site is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. A native application 107 is an application specifically designed to run on a particular user device operating system and machine firmware. Native applications 107 may include multiple versions designed to run on different platforms. For example, native applications corresponding to a movie database web site may include a first native application that runs on a first type of smart phone, a second native application that runs on a second type of smart phone, a third native application that runs on a first type of tablet, etc.

As used in this specification, an "application page" is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 116 and an application index 114. The web index 116 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

Publishers 106 that provide native applications 107 also provide the deep links 109 to the search engine 120. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

The user devices 108 submit search queries to the search engine 120. In response to each query, the search engine 120 accesses the web index 116 and, optionally, the application index 114 to identify resources and applications, respectively, that are relevant to the query. Generally, a first type of search operation implementing a first search algorithm is used to search the index 116, and a second type of search operation implementing a second, different algorithm is used to search the application index 114. The search engine 120 implements a scorer 132 process to score resources. Data describing the resource scores are provided to a search engine front end 134, which includes an affinity score adjuster 136 process. The search engine front end 134 generates search results and provides the search results to the user device 108 that issued the query. The search results may be any type of search result specific to a corpus, such as an image search result, a video search results, a web resource search result, and a native application search result. For brevity, the examples that follow will refer to web resource search results and native application search results; however, many different types of search results for respective different corpora can be used.

A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114. A native application search result may include a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

The search engine 120 also generates, or has access to, affinity data 130 that stores affinity scores. An affinity score for a native application measures the user's affinity for the native application relative to other native applications. The affinity scores and data 130 are described in more detail with reference to FIG. 2 below.

The affinity score adjuster 136 processes the affinity scores for native applications referenced by native application search results and adjusts the search results scores based on the affinity scores. The process of the score adjuster 136 is described with reference to FIG. 3 below. Using the adjusted scores, the search engine front end 134 ranks the search results, including the native application search results with the adjusted scores, and provides the search results the a user device for display to a user.

Figure 2:
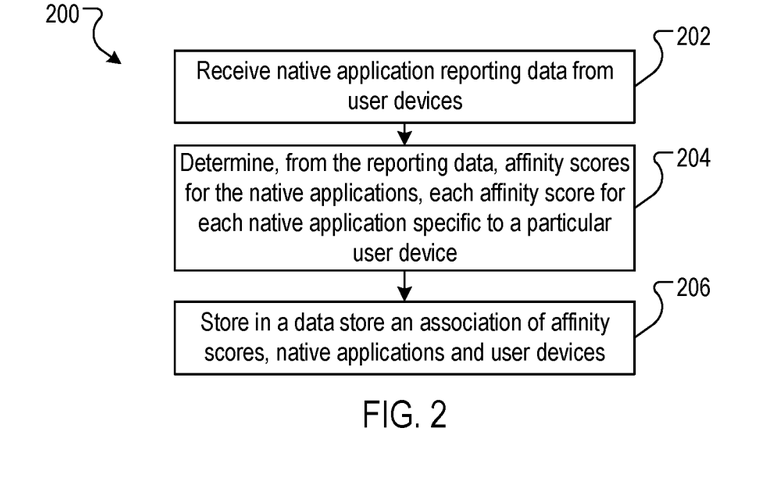
FIG. 2 is a flow diagram of an example process for generating and storing affinity data.

FIG. 2 is a flow diagram of an example process 200 for generating and storing affinity data. The process 200 is implemented in a data processing apparatus, such as the search engine 130.

The process 200 receives native application reporting data from user devices (200). For example, users of the native applications may, at the user's option, allow for reporting of application usage and status of the native application. Typically this information is reported to the application publishers 106. The application publishers 106 may then provide the data to the search engine 120. Alternatively, the native applications may provide the data to the search engine 120.

Such reporting data may include, in some implementations, when a user of the device installed the native application. For example, when the native application is installed, the device may report the installation.

The reporting data may also include how long a user has an application open and how often a user users the application. The data may be absolute or relative. For example, in the case of the former, raw time values may be provided. However, in the case of the latter, the time values may be measured relative to other applications accessed by the user. This accounts for the user's relative engagement with a native application. To illustrate, a particular user may spend only one hour a week using native applications, but of that one hour, the user spends 90% of the time using a restaurant review application. Another user, however, may spend 20 hours a week using native applications, and of those 20 hours, that user may only spend one hour using the restaurant review application. Thus, while the first user may actually spend slightly less time using the restaurant application, that user may have a relatively higher affinity for the restaurant review application than the second user.

The reporting data may also describe reviews the user has provided for the application. For example, a user that has provided a higher review for the application may have a higher affinity for the application than a user that has provided a negative review, with all other factors being equal.

The reporting data may also describe whether the user shares content from the native application with other users. For example, a user that has shared content from the native application may have a higher affinity for the application than a user that shares content from the application by other means, such as my e-mailing the content, or that does not share content from the native application.

When free and paid versions of the native application are available, the reporting data may also describe whether the user has a free version of the native application or a paid version. For example, a user with a free version of the native application may have a lower affinity for the native application than a user with a paid version of the native application, with all else being equal.

The reporting data may also describe how often the user consumes content using the native application with such content is provided by alternative sources. For example, a news reader native application may have a corresponding web-based news website. A user with that consumes content using the native application more often than using the web-based news website may have a higher affinity for the native application than a user that consumes content using the web-based news website more often than using the native application.

Other appropriate reporting data may also be provided by the user device. Typically, the reporting data is provided separate from search queries. This facilitates the processing of the reporting data and the generation of affinity scores before query time.

The process 200 determines, from the reporting data, affinity scores for the native applications, wherein each affinity score for each native application specific to a particular user device or user. For example, the search engine 120 processes the data to determine, for each user, an affinity score for each native application with which the user is associated. A user is associated with a native application when, for example, a user device of the user is used to download the native application, or when a user has purchased the native application, or when the user has taken some action with respect to the native application.

For a particular native application, an affinity score may be based on a combination of the values reported by the reporting data. Various weighting schemes may be used for each factor, and a variety of appropriate functions for combining the values may also be used. In some implementations, reporting data that indicates a higher level of engagement will result in a higher affinity score for a particular native application.

In some implementations, affinity for native applications for a user may also be aggregated by vertical or category. For example, reporting data may describe that a user uses many different financial native applications. The search engine 120 may generate an additional affinity score for financial native applications that is applied to all native applications that belong to this category. Thus, when a new native application is published that is a financial native application, the user may have a category-based affinity score for that native application, despite the fact that the user has not used the native application before.

In a related implementation, affinity for native applications for a user may also be aggregated by publisher. For example, reporting data may describe that a user uses many different native applications from a particular publisher. The search engine 120 may generate an additional affinity score for native applications published by the publisher and that is applied to all native applications published by the publisher. Thus, when a new native application is published by the publisher, the user may have a publisher-based affinity score for that native application, despite the fact that the user has not used the native application before.

The process 200 stores in a data store an association of affinity scores, native applications and user devices (206). For example, the search engine 120 may store in the affinity data 130, for each user of a user device, an affinity score for the user for a particular native application. Additional affinity scores, such as category-based affinity scores, publisher-based affinity scores, are also stored in the affinity data 130 if these additional scores are determined.

Figure 3:
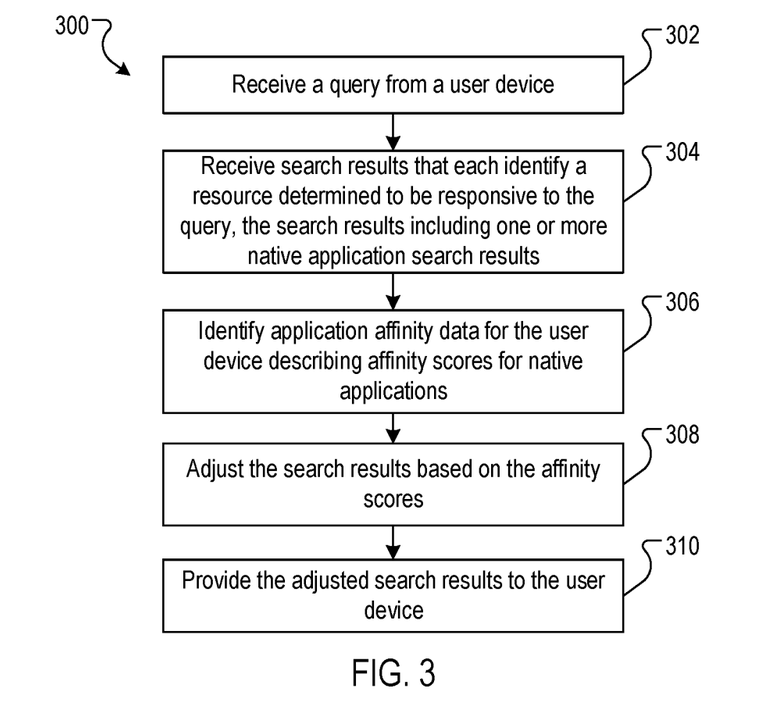
FIG. 3 is a flow diagram of an example process for adjusting search results based on indexed affinity data.

Once determined and stored, the affinity scores may be used to adjust search result scores. For example, FIG. 3 is a flow diagram of an example process 300 for adjusting search results based on indexed affinity data. The process 300 is implemented in a data processing apparatus, such as the search engine 130.

The process 300 receives a query from a user device (302). For example, the search engine 120 receives a query from a user device. The query, in addition to including one or more terms, also includes data identifying the user device and/or a user account with which affinity scores are associated in the affinity data.

The process 300 receives search results that each identify a resource determined to be responsive to the query, and the search results include one or more native application search results (304). The search results are order according to underlying search scores by which the content is ranked in responsiveness to the search relative to the content identified by other search results. For example, with reference to FIG. 4A, which is an illustration of a search results page 400 that includes native application search results responsive to the query [Jane's Restaurant] ordered according to an organic ranking. The organic ranking does not take into account native application affinity scores for a particular user. The search results include search results 404, 406 and 410, which include links to web pages, and native application search results 408, 412 and 414, which include deep links 409, 413 and 415 to corresponding native applications. One of the search results, search result 412, also includes a link a website that corresponds to the native application referenced by the search result 412. Without adjusting the search scores by the affinity data, the search engine 120 will deliver the search results according to the ordinal positions shown in FIG. 4A.

The process 300 identifies application affinity data for the user device describing affinity scores for native applications (306). For example, the search engine 120, by use of an affinity score adjuster processes 136, accesses the affinity data 130, and for each native application search result identifying a native application, accesses the affinity score associated with the user for that native application. In this example, the search engine 120 would access affinity scores for the native applications "Best Restaurants," "Mapper App," and "Restaurant Review App." Although only three native application search results are shown, the search engine 120 may access affinity scores for a larger set of search results, e.g., the first 100 search results generated by the search engine front end 134.

The process 300 adjusts the search results based on the affinity scores (308). The search engine 120 can use any appropriate adjustment process in the affinity score adjuster process 136. For example, if an affinity score meets a first threshold, the affinity scores may result in a boost proportional to the amount by which the affinity score exceeds the first threshold. Likewise, if an affinity score does not meet a second threshold that is less than the first threshold, the affinity scores may result in a demotion proportional to the amount by which the affinity score is less than the second threshold.

In some implementations, the adjusting the search score of a native application search result based on its affinity score is done relative to the affinity score of the native applications referenced by the other native application search results. For example, in FIG. 4A, if the affinity score for each native application of the three native application search results are each relatively high, then the native application search results may not be adjusted relative to each other. Conversely, if the affinity scores differ significantly, then the native application search result may be adjusted relative to each other. For example, assume the affinity scores for the respective native applications referenced by the links 409, 413 and 415 are respectively normalized to 0.9, 1.0 and 0.7. This may result in an adjustment of the search result 408 relative to 412 such that the native application search result 412 is ranked higher than the native application search result 408.

Figure 4A:
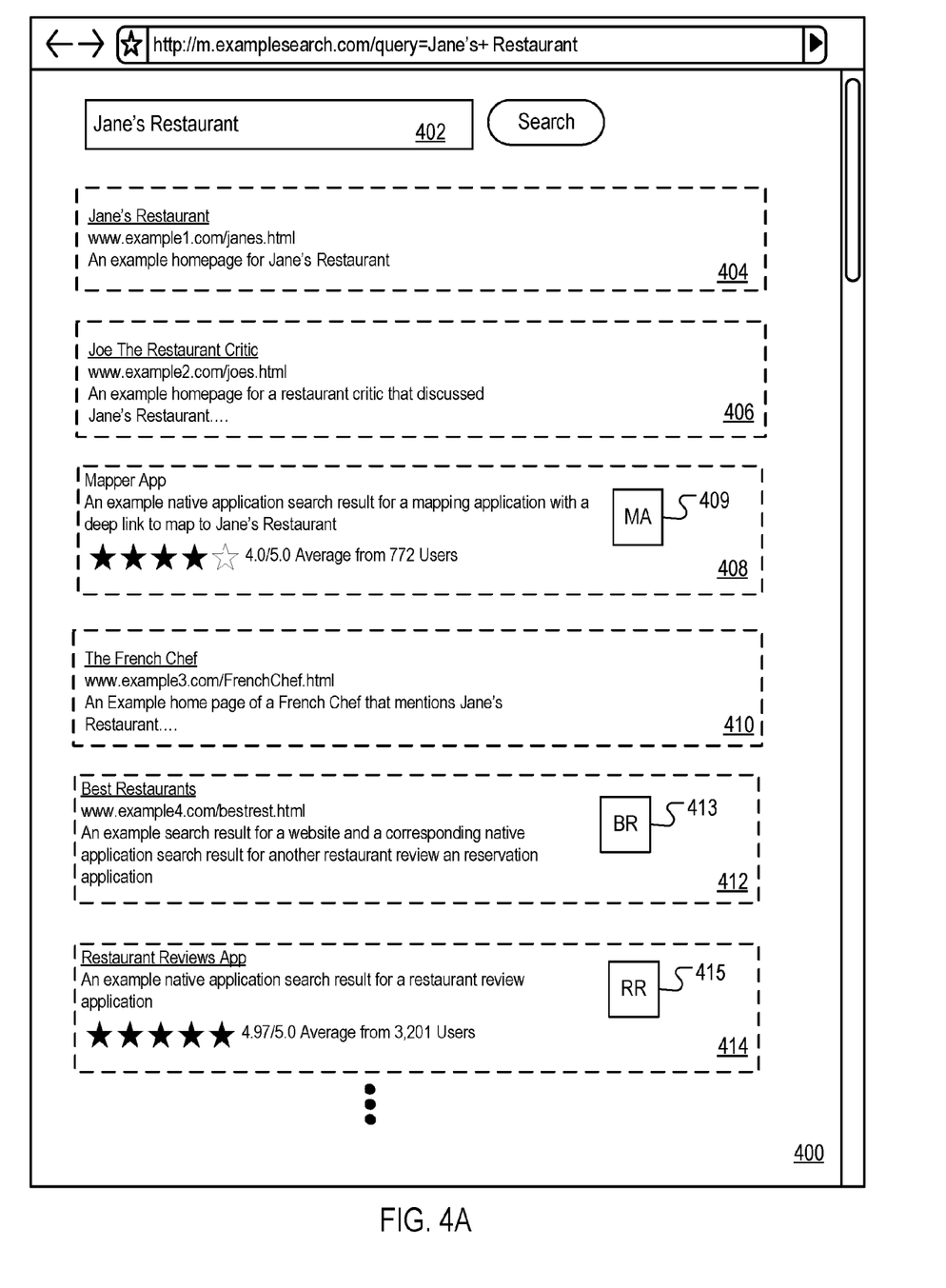
FIG. 4A is an illustration of a search results page that includes native application search results ordered according to an organic ranking.

In some implementations, the native application search results are adjusted relative to each other and within the respective ordinal positions, and the web based search results are not adjusted. For example, if the native application search results were originally at ordinal positions 3, 5 and 7, then the adjusted native application search results would still occupy positions 3, 5 and 7.

Figure 4B:
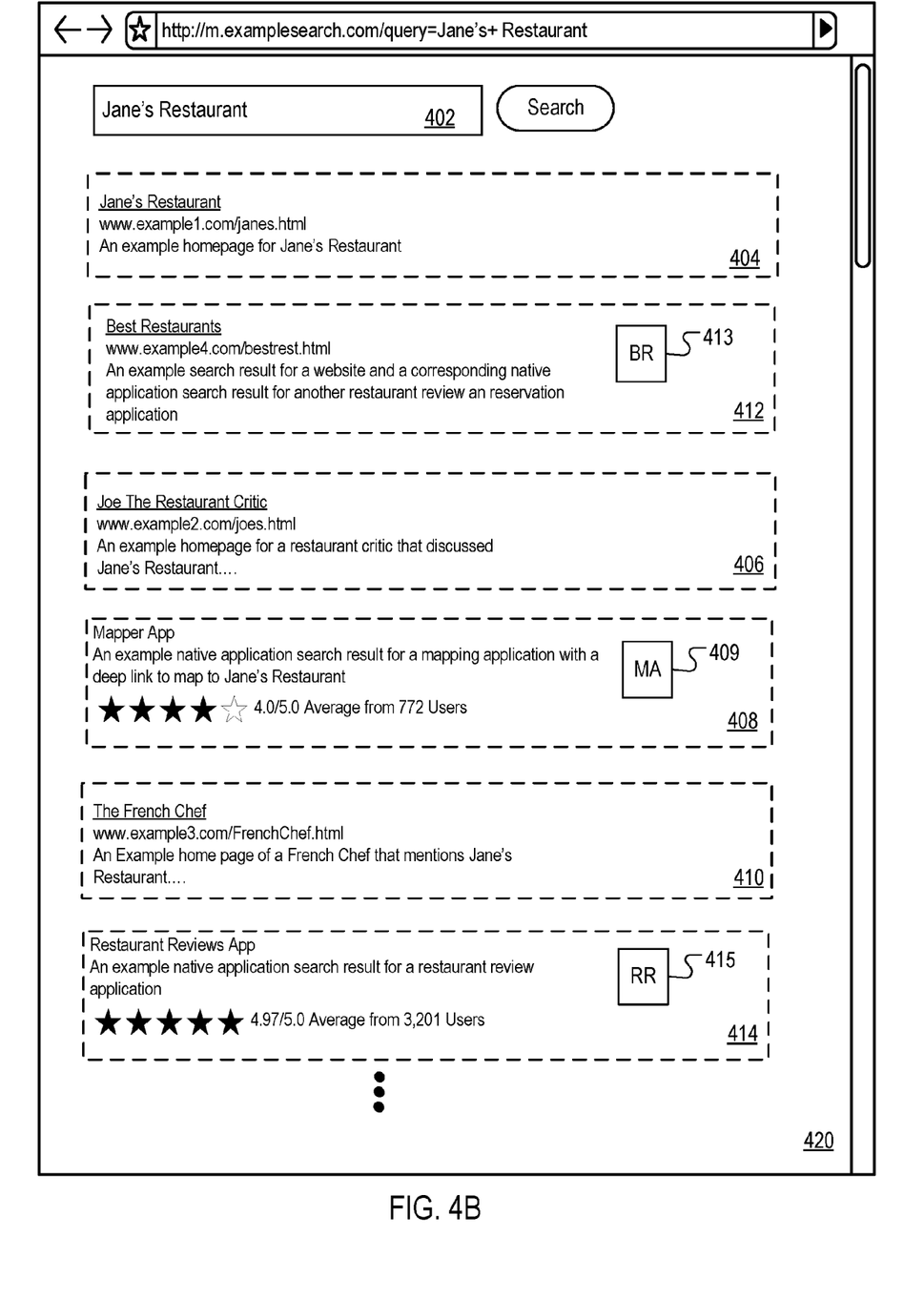
FIG. 4B is an illustration of a search results page that includes a native application search results ordered, in part, according to affinity scores of a user.

The process 300 provides the adjusted search results to the user device (310). For example, FIG. 4B is an illustration of a search results page 420 in which the native application search results 412, 408 and 414 are ordered, in part, according to affinity scores of the user that issued the query [Jane's Restaurant].

Other appropriate adjustments to search result scores based on the affinity scores may also be made. For example, in some implementations, adjustments may be based on both user affinity for a particular application, and also based on per-category and/or per-publisher affinity scores.

Furthermore, adjustments based on category, vertical, publisher, or any other class-based affinity score that applies to a set of two more native applications may be subject to a signal of interest for the class-based affinity score being detected. A signal of interest may be detected, for example, based on a keyword of a query. To illustrate, the query [Jane's Restaurant] is a name of a particular restaurant, and thus the affinity score adjuster 136 may determine that the user is interested in information related to the restaurant, and not related to a class of native applications. Conversely, for the query [restaurant review apps], the term "apps," preceded by the modifier "restaurant review," indicates the user is interested in native applications related to the category of restaurant reviews, and an affinity score for that class of native applications for the user may be used to adjust scores of native applications that belong to the class. Likewise, for the query [publisher X apps], the term "apps," preceded by the modifier "publisher X," indicates the user is interested in native applications published by publisher X.

The native application affinity scores can also be used for other adjustment operations in addition to adjusting search scores (and thus the ordinal positions of search results). In additional implementations, native application affinity scores can be used when selecting advertisements to serve for the native applications. For example, CPM parameter values for ads may be adjusted based on the native application affinity score. Ads that are relevant to a particular native application for which a user has a very high affinity score may have a higher CPM than for ads relevant to a particular native application for which a user has a relative low affinity score.

By way of another example, native application affinity scores can also be used to adjust scores of suggestions for search operations. For example, a native application affinity score indicating a high affinity for a certain real estate native application may result in a query completion of "LA h" to "LA homes for sale," which is a different completion than if affinity was not considered. The completion can be based, in part, on processing search queries that have been provided by use of the native application and search queries that have been provided to the search engine and that are determined to be relevant to the certain real estate native application. Thus, selection of the query suggest in a web-based search engine interface would result in the surfacing of a native application search result for the real estate native application at a relatively high rank, e.g., a first, second or third ordinal position, for example.

By way of another example, native application affinity scores can also be used to adjust scores for query rewrites for search operations. For example, continuing with the real estate native application example, a native application affinity score indicating a high affinity for the certain real estate native application may result in a query rewrite of "nearby rentals" to "LA apartments for rent," which is a different rewrite than if affinity was not considered. The rewrite can be based, in part, on processing search queries that have been provided by use of the native application and search queries that have been provided to the search engine and that are determined to be relevant to the certain real estate native application.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML, page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:

receiving a search query submitted from a user device for a search operation;

accessing application affinity data for the user device from which the query was received, the application affinity data describing, for a plurality of native applications installed on the device, an affinity score for the native application that measures the user's affinity for the native application relative to other native applications, and wherein the application affinity data is received responsive to a reporting process that is separate from the search operation;

receiving a set of search results that each identify a respective resource determined to be responsive to the query, and wherein each of the identified resources has a corresponding search score by which the resource is ranked in responsiveness to the search relative to other resources, and wherein one or more of the search results are a native application search results that each include a deep link to a respective one of the native applications installed on the user device from when the query was received;

for each of the native application search results, determining the affinity score of the native application, the determining the affinity score comprising:

determining, from usage data received from the user device, a first time measure that is inclusive of usage time of a plurality of native applications installed on the user device;

for each native application of the plurality of native applications installed on the user device:

determining, from the reporting data received from the user device, a respective second time measure for the native application on the user device;

determining a relative engagement measure for the native application based on the respective second time measure and the first time measure; and determining the affinity score of the native application based on the relative engagement measure determined for the native application;

adjusting the search results based on the affinity scores to generate an adjusted set of search results; and providing, to the user device, the adjusted search results.

2. The computer-implemented method of claim 1, wherein adjusting the search results based on the affinity scores to generate an adjusted set of search results comprises generating an adjusted set of search results in which at least one of the native application search results is adjusted in its respective rank position relative to other search results in the set of search results.

3. The computer-implemented method of claim 2, wherein:
the one or more native application search results comprise a plurality of native application search results, each at a respective ordinal position in the set of search results; and
wherein adjusting the search results based on the affinity scores comprises adjusting only the native application search results relative to each other and within the respective ordinal positions.

4. The computer-implemented method of claim 3, wherein adjusting the search results comprises adjusting the search score of a native application search result based on its affinity score relative to the affinity score of the native applications referenced by the other native application search results.

5. The computer-implemented method of claim 2, wherein adjusting the search results comprises adjusting the search score of a native application search result based on its affinity score relative to the affinity score of the native applications referenced by the other native application search results.

6. The computer-implemented method of claim 1, wherein adjusting the search results comprises adjusting the search score of a native application search result based on its affinity score relative to an affinity score threshold.

7. The computer-implemented method of claim 1, wherein:
the one or more native application search results comprise a plurality of native application search results, and at least a first subset of the native applications referenced by the native application search results are categorized as belonging to a first vertical and a second subset of the native applications referenced by native application search results are categorized as belonging to a second vertical; and
wherein adjusting the search results based on the affinity scores comprises adjusting only the native application search results in a same vertical relative to each other.

8. The computer implemented method of claim 1, further comprising receiving the application affinity data responsive to the reporting process, the receiving comprising:
receiving, from each of a plurality of user devices and separate from the queries submitted by the user devices, native application reporting data that describes, for each user device, usage of native applications on the user device;
for each user device:
determining, from the reporting data, the affinity score for the native application specific to the user device; and
storing in a data store an association of the affinity score, an identification of the native application, and an identification of the user device; and
wherein determining the affinity score of the native application for each of the native application search results comprise accesses the association of the affinity score, the identification of the native application, and the identification of the user device.

9. The computer-implemented method of claim 8, wherein the reporting data for a user device includes a description of an average duration of use of the native application at the user device.

10. The computer-implemented method of claim 8, wherein the reporting data for a user device includes a description of a total time duration of use of the native application at the user device.

11. The computer-implemented method of claim 8, wherein the reporting data for a user device includes data identifying that the native application is a preferred native application for a particular operation from among a plurality of native applications installed on the user device that can perform the particular operation.

12. A system, comprising:
a data processing apparatus; and
software stored in non-transitory computer readable storage medium storing instructions executable by the data processing apparatus and that upon such execution cause the data processing apparatus to perform operations comprising:
receiving a search query submitted from a user device for a search operation;
accessing application affinity data for the user device from which the query was received, the application affinity data describing, for a plurality of native applications installed on the device, an affinity score for the native application that measures the user's affinity for the native application relative to other native applications, and wherein the application affinity data is received responsive to a reporting process that is separate from the search operation;
receiving a set of search results that each identify a respective resource determined to be responsive to the query, and wherein each of the identified resources has a corresponding search score by which the resource is ranked in responsiveness to the search relative to other resources, and wherein one or more of the search results are a native application search results that each include a deep link to a respective one of the native applications installed on the user device from when the query was received;
for each of the native application search results, determining the affinity score of the native application, the determining the affinity score comprising:
determining, from usage data received from the user device, a first time measure that is inclusive of usage time of a plurality of native applications installed on the user device;
for each native application of the plurality of native applications installed on the user device:
determining, from the reporting data received from the user device, a respective second time measure for the native application on the user device;
determining a relative engagement measure for the native application based on the respective second time measure and the first time measure; and
determining the affinity score of the native application based on the relative engagement measure determined for the native application;
adjusting the search results based on the affinity scores to generate an adjusted set of search results; and
providing, to the user device, the adjusted search results.

13. The system of claim 12, wherein adjusting the search results based on the affinity scores to generate an adjusted set of search results comprises generating an adjusted set of search results in which at least one of the native application search results is adjusted in its respective rank position relative to other search results in the set of search results.

14. The system of claim 13, wherein:
the one or more native application search results comprise a plurality of native application search results, each at a respective ordinal position in the set of search results; and
wherein adjusting the search results based on the affinity scores comprises adjusting only the native application search results relative to each other and within the respective ordinal positions.

15. The system of claim 14, wherein adjusting the search results comprises adjusting the search score of a native application search result based on its affinity score relative to the affinity score of the native applications referenced by the other native application search results.

16. The system of claim 12, wherein adjusting the search results comprises adjusting the search score of a native application search result based on its affinity score relative to the affinity score of the native applications referenced by the other native application search results.

17. The system of claim 12, wherein adjusting the search results comprises adjusting the search score of a native application search result based on its affinity score relative to an affinity score threshold.

18. The system of claim 12, the operations further comprising receiving the application affinity data responsive to the reporting process, the receiving comprising:
receiving, from each of a plurality of user devices and separate from the queries submitted by the user devices, native application reporting data that describes, for each user device, usage of native applications on the user device;
for each user device:
determining, from the reporting data, the affinity score for the native application specific to the user device; and
storing in a data store an association of the affinity score, an identification of the native application, and an identification of the user device; and
wherein determining the affinity score of the native application for each of the native application search results comprise accesses the association of the affinity score, the identification of the native application, and the identification of the user device.

19. A non-transitory computer readable storage medium storing instructions executable by a data processing apparatus and that upon such execution cause the data processing apparatus to perform operations comprising:
receiving a search query submitted from a user device for a search operation;
accessing application affinity data for the user device from which the query was received, the application affinity data describing, for a plurality of native applications installed on the device, an affinity score for the native application that measures the user's affinity for the native application relative to other native applications, and wherein the application affinity data is received responsive to a reporting process that is separate from the search operation;
receiving a set of search results that each identify a respective resource determined to be responsive to the query, and wherein each of the identified resources has a corresponding search score by which the resource is ranked in responsiveness to the search relative to other resources, and wherein one or more of the search results are a native application search results that each include a deep link to a respective one of the native applications installed on the user device from when the query was received;
for each of the native application search results, determining the affinity score of the native application, the determining the affinity score comprising:
determining, from usage data received from the user device, a first time measure that is inclusive of usage time of a plurality of native applications installed on the user device;
for each native application of the plurality of native applications installed on the user device:
determining, from the reporting data received from the user device, a respective second time measure for the native application on the user device;
determining a relative engagement measure for the native application based on the respective second time measure and the first time measure; and
determining the affinity score of the native application based on the relative engagement measure determined for the native application;
adjusting the search results based on the affinity scores to generate an adjusted set of search results; and
providing, to the user device, the adjusted search results.

* * * * *

UNITED STATES PATENT AND TRADEMARK OFFICE
CERTIFICATE OF CORRECTION

| | | |
|---|---|---|
| PATENT NO. | : 10,248,698 B2 | Page 1 of 1 |
| APPLICATION NO. | : 15/099209 | |
| DATED | : April 2, 2019 | |
| INVENTOR(S) | : Andrianakou et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this
Twenty-ninth Day of October, 2019

Andrei Iancu
*Director of the United States Patent and Trademark Office*